Dec. 21, 1965 J. RABINOW 3,225,329

OPTICAL LOGIC READING MACHINE

Filed Oct. 30, 1963

INVENTOR

Jacob Rabinow

BY Joseph A. Genovese & Max L. Libman

ATTORNEYS

United States Patent Office 3,225,329
Patented Dec. 21, 1965

3,225,329

OPTICAL LOGIC READING MACHINE

Jacob Rabinow, Bethesda, Md., assignor, by mesne assignments, to Control Data Corporation, Minneapolis, Minn., a corporation of Minnesota Filed Oct. 30, 1963, Ser. No. 320,182
10 Claims. (Cl. 340—146.3)

This invention relates to optical reading machines, and particularly to a reading machine wherein a portion of the machine logic is accomplished by optical means.

Although there are several types of commercially available reading machines and numerous others described in prior patents, for the most part they are expensive devices. There is a need for an inexpensive optical reading machine, and my invention provides such a machine.

All reading machines of which I am aware, identify characters by examining the character-area, and comparing the results of the examination with a set of character criteria built in the machine. In some instances the ultimate decision is made on the basis of the unknown character most closely matching one criterion (Rabinow Patent No. 2,933,246), and in other cases the ultimate decision is made on the basis of the unknown character possessing all or a threshold number of parts, pieces, bits, etc. of a given criterion. The means for processing the information extracted from the unknown character and its background in order to prepare it for the decision section (sometimes called "interpreter") of the machine are both complex and expensive. Usually such means are digital computer-like logic circuits, sometimes supplemented by magnetic memory devices, encoders, etc. It is with this portion of reading machines that my invention is specifically concerned.

In my invention I use an optical system to form an image of an unknown character on an image-receiving surface preferably consisting of a mosaic of optical light pipes. The receiving ends of the light pipes are arranged as a matrix grid, while the opposite ends of these light pipes are in a linear arrangement, preferably (but not necessarily) in a straight or curved single line. Thus, the group of light pipes achieves a linear transformation of the character image and its background appearing on the receiving surface. Since the light pipes are discrete, the linearly arranged ends thereof form individual light distribution areas which are used as described later.

A group of photocells, for example photomultipliers, are arranged in a line transverse (preferably at right angles) to the line of the distribution areas of the above light pipes, and spaced therefrom. I have at least one photocell for each character which the machine is designed to identify. In addition to this I have separate groups of light pipes of smaller diameter than those which define the receiving surface and light distribution areas. For identification purposes, the larger diameter light pipes whose first set of ends form the image-receiving surface, shall henceforth be referred to as the "first" group while the smaller diameter light pipes shall be considered the "second" light pipes. The second light pipes are arranged in individual groups, there being one group (at least) for each unknown character that the machine is designed to identify. For a single, typical group of second light pipes, one set of ends are optically aligned with a photomultiplier, and the other set of ends are optically aligned with preselected first light pipes and, explicitly, the distribution areas of the image-transformation ends thereof. In a like manner the groups of second light pipes for the remaining individual characters are optically aligned with respective photocells and preselected distribution areas of the first light pipes. Accordingly, a significant portion of the logic of the reading machine is accomplished by the above arrangement of individual light pipes in the separate groups of second light pipes.

The angular relationship of the linear distribution areas of the first light pipes and the line of photocells is deemed an important geometrical relation. It makes possible the arrangement of the groups of second light pipes in a manner such that they do not interfere with each other as would be the case if one attempted to eliminate the first group of light pipes and use only second groups. Furthermore, the same point on the matrix-receiving surface may be essential to the recognition of more than one character, and therefore it is not possible to use more than one light pipe in the receiving surface to examine the same elemental sub-area. In my invention this does not present a problem. For instance, if the lower right corner of the mosaic must be examined for two or three or more characters, the light transmitting area pertaining to this corner has the two or three or more light pipes of the second group optically aligned therewith (and, of course, with the respective photocells involved).

A feature of my invention is that as far as my improvement is concerned, character recognition is not slowed. As the image and its background is presented to the receiving surface it is disected by the first light pipes at the mosaic and individual distribution areas, and logically combined by the separate groups of second light pipes, and presented to the individual photocells at the speed of light conduction through the light pipes. The effect of my invention is to sub-divide the image area, transform the subdivisions, and combine preselected subdivisions in accordance with the expected configuration of each unknown character that the machine is expected to identify.

I indicated previously that my invention fulfills a need for an inexpensive optical character reading machine. In this regard the use of simple light pipes to perform the examination of the individual elements of a character area, and logically combine selected ones thereof, are not only faster than electronic means for achieving the same purpose, but also less expensive.

It will occur to a person skilled in this art that an ordinary mask-comparison reading machine is also, at least in theory, an inexpensive device. However the inherent deficiencies of a mask-comparison reading machine are also apparent. First of all, it is not a simple matter to investigate individual sub areas by a mask-comparison machine in the absence of a moving spot scanner. A moving spot scanner, even a cathode ray tube as I have shown in my above patent, is slower than simple presentation of an image of an unknown character to a mosaic receiving surface.

Another advantage of my invention is that of flexibility. Once masks are designed for a reading machine it is not a simple matter to alter them. In contrast, I have complete freedom to select any point in the receiving surface by physically connecting a second light pipe to its corresponding light distribution area and to the pertinent photocell. It is not convenient to use negations in mask-machines, although this is possible as disclosed in the Rabinow Patent No. 3,167,744. As described in detail later, this is very easy with my present invention. It is also considerably easier to use weighting techniques (see Rabinow et al., Patent No. 3,104,369) with my present invention than any mask machine of which I am aware. In my invention I can always use electronic weighting as disclosed in the Rabinow et al. patent, but my present invention affords the opportunity to optically weight by using either more than one second light pipe in a given location or by using a more transmissive light pipe such as a larger diameter light pipe for the same purpose.

Accordingly, another object of my invention is to provide an optical character reading machine substantially in accordance with the foregoing.

A further object of my invention is to provide a reading machine wherein a character area is subdivided into elemental sub-areas, and these are transformed to a linear pattern, enabling selected sub-areas to be examined individually and simultaneously by a plurality of photocells which are optically coupled to the preselected distribution areas by means of groups of second light conducting elements.

A further object of the invention is to provide a reading machine in accordance with the preceding objective, wherein the geometrical arrangement of the receiving surface, the transformation, distribution area, and photocells is such that the groups of second elements can be physically arranged so that they do not interfere with each other.

Other objects and features of importance will become apparent in following the description of the illustrated forms of the invention which are given by way of example only.

Figures 1, 2, 3:
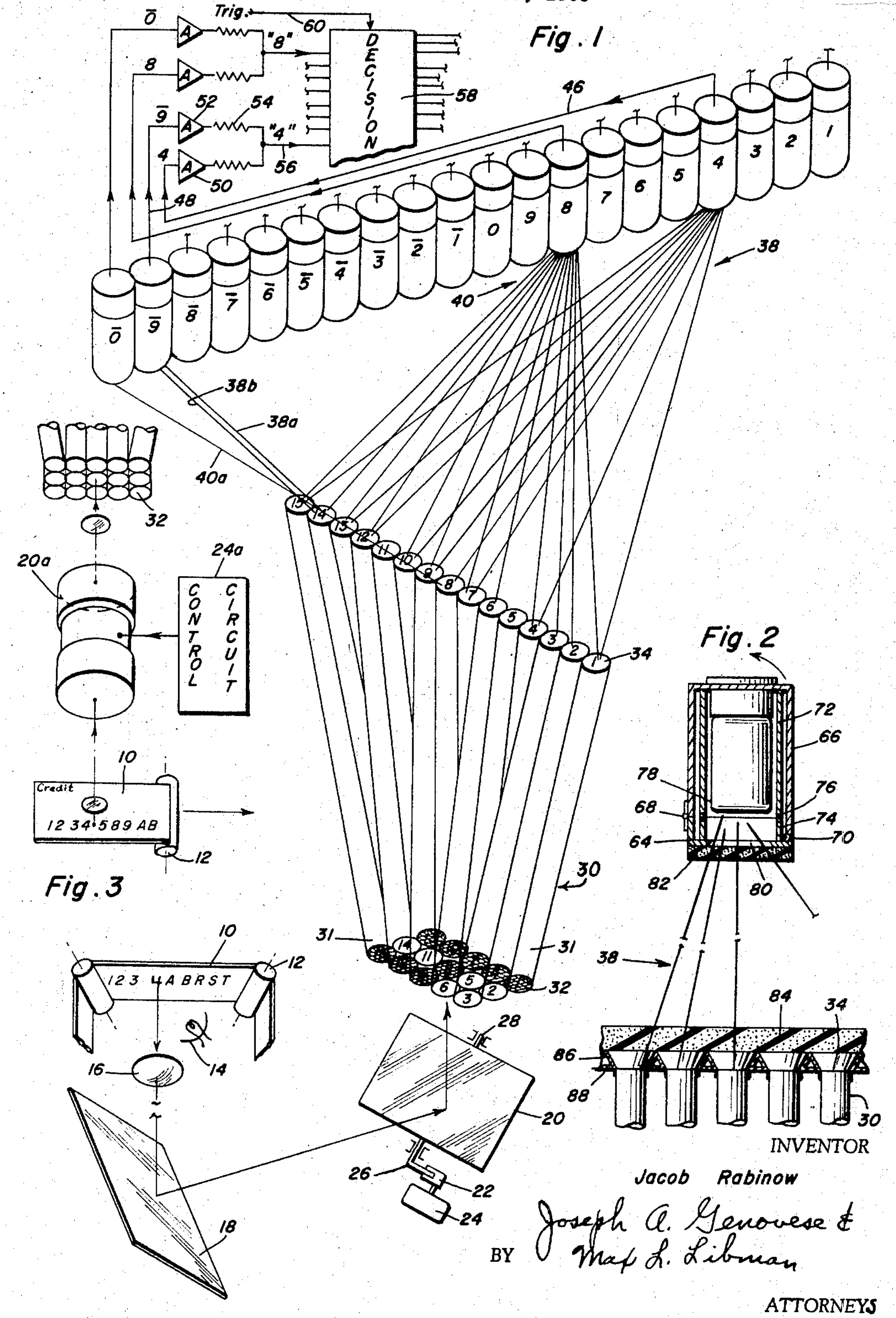
FIGURE 1 is a diagrammatic view with parts shown in perspective, illustrating one form of my invention.
FIGURE 2 is a cross-sectional view showing principally one arrangement of the line of photocells at right angles to the linear pattern of the transformation or distribution area.
FIGURE 3 is a diagrammatic perspective view showing a modification using an image converter in the optical path between the character being examined and the mosaic forming the image-receiving surface of FIGURE 1.

FIGURE 1 shows a reading machine system in accordance with the invention. Document 10 is shown being moved by conventional transport 12. The characters on the document are illuminated by lamp 14, and lens 16 forms images of the characters, via mirrors 18 and 20, on the plane of the ends 31 of light pipes 30. The characters are swept past the lens by transport 12. Mirror 20 is aligned with mirror 18, and it is oscillated by conventional means, diagrammatically shown as cam 22 operated by motor 24, together with cam follower 26 attached to mirror 20 in a manner such as to oscillate the mirror about pivot 28. Thus, as the characters are moved across the surface of mirror 20 (by document motion) their images are oscillated at right angles to this motion by mirror 20.

A first group 30 of optical conductive elements, commonly referred to as light pipes, are arranged with one set of ends 31 forming a receiving surface 32 which confronts the surface of mirror 20. The ends 31 of the group 30 of light pipes are formed as a mosaic on which the unknown character image and its background are formed. The ends 34 of the group 30 of light pipes form individual light transmitting areas, and these are arranged in a line to effect a transformation of the sub-areas of the mosaic receiving surface.

I have at least one photocell, e.g., a photomultiplier, for each character that the machine is expected to identify. As shown near the top of FIGURE 1, there are ten assertion photocells for the numerals 0–9, inclusive, together with ten negation photocells for the "not" term of each. As will be described later, twenty photocells are not required or the ten numbers; but they are illustrated to simplify the picture. For now, the geometrical arrangement of the photocells is considered. They are in a line transverse (preferably at right angles) to the longitudinal axis of the transmitting areas 34 and are spaced therefrom to provide room for groups 38 and 40 (and others, not shown) of second light pipes which optically couple selected distribution areas at the transformation line, and selected photocells. The group 38 (FIGURE 1) is arranged in a manner to enable the "4" photomultiplier to study sub-areas where the numeral image of the "4" is expected on the image-receiving mosaic. Following the numerical designations on FIGURE 1, the mosaic sub-areas are 1, 4, 7–10, 12, 13 and 15. The distribution areas are similarly numerically identified. Thus, the effect of the group of light pipes 38 is to enable the "4" photocell to examine the above sub-areas of the mosaic, and only those. It can be assumed that the numeral "4" is a subset of the numeral "9" in certain fonts. Thus, if a "9" were projected onto the receiving surface, all of the above elemental sub-areas would be satisfied for the "4." To overcome this difficulty I use the negation of the "9," i.e., light pipe **38*a* extending between light transmitting sub-area No. 14 and the "not-9" photomultiplier and electrically combine the outputs of the two photocells (specifically described later). To stress the importance of sub-area No. 14 in the identification of the numeral "4" I can use optical weighting by either using a larger diameter light pipe 38*a* or using more than one light pipe, e.g. 38*b***.

In furtherance of the optical logic illustration, the group 40 of second light pipes is correctly arranged for the identification of the "8," including the negation light pipe **40*a* extending between sub-area No. 8** and the "not-0" photomultiplier.

In use, as characters on a document are moved in one direction, the images of the characters and their backgrounds are swept in one direction, across the receiving surface. At the same time the character images are transversely oscillated on the receiving surface to overcome the familiar "vertical" registration problem. While the character image is executing these motions, the individual sub-areas (1–15 at ends 31 of light pipes 30) of the receiving surface are continually examined by the photomultipliers by way of the groups of second light pipes which optically couple the photomultipliers with predetermined and preselected sub-areas at the linear transformation distribution areas No. 1–15.

FIGURE 3 shows an image converter tube **20*a* with its control circuitry 24*a* to provide "vertical" registry motions of the character image, equivalent to those produced by the oscillating mirror 20**. In addition, the image converter tube is capable of providing other components of motion to the image in a manner identical to that described in the Rabinow pending application, Serial No. 276,471, wherein there is a description of the capabilities of image converter tubes.

The output of each photomultiplier during the identification of a character is handled in a manner considered to be conventional as far as my present invention is concerned. As indicated at the top of FIGURE 1, the output line 46 of the "4" photomultiplier and the output line 48 of the "not-9" photomultiplier form inputs for amplifiers 50 and 52 designed to provide an output signal as follows: When the "4" amplifier is exposed to little or "no" light amplifier 50 provides its maximum signal. When the "not-9" photomultiplier experiences bright light amplifier 52 provides its maximum output signal. The output signals of the amplifiers 50 and 52 are combined by means of a resistor adder 54 whose output line conducts a signal corresponding to the degree of match of the unknown character on the receiving surface with the character-criterion established for the numeral "4" by means of the optical logic formed by the arrangement of light pipes in group 38 (including pipes **38*a* and 38*b*). The decision section 58 of FIGURE 1 is simply a comparitor which selects, in the illustrated instance, the highest signal on the various character lines 56 (only a few shown) when triggered by a control signal on line 60. The resistor-adders decision section 58 and trigger signal line 60** can be the same or similar to those described in U.S. Patent No. 3,104,369, and/or the Rabinow pending application, Serial No. 115,267. In the last-mentioned application other signals and features are described, many of which can be incorporated herein, for instance the capacitor storage, the guard cells, etc.

It is fairly obvious that my reading machine requires additional structural and electronic components which are well known in the art. For instance, I have shown no power supplies. I have also shown no framework for the machine other than in FIGURE 2. This view is a cross-section through the line of photocells and a portion of the linear distribution areas (ends 34 of light pipes 30). The photomultiplier shown in FIGURE 2 is not only light-shielded from all other photomultipliers but also from ambient light. To do this I have a housing 64 provided with a cover 66 hinged as at 68 to the base portion of the housing. The photomultiplier sockets are attached to the top of the cover, and the juncture of cover 66 with the base of the housing is made light tight, e.g. by a labyrinth, a gasket, padding 70, etc. A cardboard or metal tubular shield 72 has an upper section attached to the photomultiplier base or to the cover of the housing and a lower section 74, attached to the lower part of the housing. The upper section is swingable with the cover of the housing, and the lower section 74 is fixed to the base part of the housing. A light exclusion seal 76 (or the equivalent) is at the juncture of the two sections of the light shield 72. Thus, the light shield defines a light-tight cavity 78 in which the illustrated (FIGURE 2) photomultiplier is located. I use a hinged housing to allow the bank (or any portion thereof) of photomultipliers to be swung back for the placement of the light pipes of the second groups, e.g. group 38, partially shown in FIGURE 2 and fully shown in FIGURE 1.

The bottom of housing 64 has an opening 80 covered by a resilient membrane or pad 82, for instance sponge plastic or rubber so that the light pipes of the second group can be pushed therethrough from the open top of the housing, while the passage formed by the light pipe is sealed by the elastic action of the membrane. This light-sealing method is given by way of example only, and other light-sealing methods for light pipes can be restored. The lower ends of the second light pipes are passed through the membrane or pad 84 which is similar to the pad 82, to enable the lower ends of the optical logic light pipes to be optically aligned with the upper ends of the selected light distribution areas (ends 34 of light pipes). The pad 84 is a light shield for the ends 34 of light pipes 30. To further assure that there will be no cross-talk of illumination between light pipes 30 (although none is expected in view of the nature of optical light pipes) I use pad 84 in combination with small funnels 86 at the apertures in light pipe-supporting plate 88 to which the upper ends of the light pipes of first group 30 are supported, e.g. by grommets, cementing, etc.

It is understood that the illustrated forms of the invention are given by way of example only, and that numerous changes, modifications and alterations may be made without departing from the protection of the following claims. For example, non-linearly arranged arrays of photocells and light pipes may be used to produce results similar to those described herein. For instance, if the light pipes 38, 40, etc., are bent specifically to fit into the space provided and to clear each other, the photocells can be arranged in two or more rows and/or the ends (34) of the first set (30) can be arranged in an arc or a circle. I have shown the straight-line arrangement for convenience in describing my invention, and for the very realistic reason that straight light pipes are both very much cheaper than curved light pipes and are considerably easier to use.

I claim:

1. In an optical character reading machine including means to form an image of an unkown character and its background, a receiving surface on which said image is formed, means to conduct light from parts of the image of the character and background on said surface to individual distribution areas in a manner such that the combination of all of said areas provides a dissected image of the character and its background in separate parts, a plurality of groups of light conductive members, there being at least one group for each character to be identified, the members of said groups optically aligned at one end with said distribution areas which are preselected in accordance with the shapes of the characters to be identified, and at least one photosensitive means for each character, each photosensitive means operatively associated with the opposite ends of one of said groups of light conductive members to provide signals on which to base a character identity decision.

2. The reading machine of claim 1 wherein said individual distribution areas are arranged to form a line, and said photosensitive means are photocells which are also arranged in a line at an angle to and spaced from the distribution areas line, and each group of said members bunched at the photocell ends and fanned out at the distribution areas ends.

3. The machine of claim 1 and means for causing said image to move in one direction across said receiving surface, and simultaneously operative means for moving said image at an angle to said direction to facilitate registration of the image on said surface.

4. In an optical character reading machine having means to form an image of an unknown character area, a first set of light pipes, one end of each light pipe arranged in a mosaic to provide a surface on which said image is formed, at least one photocell for each character that the machine is expected to identify, light conductive means operatively associated with each photocell and selected light pipes in a manner such that the conductive means for a photocell for a given character are operatively associated with those light pipes of the mosaic on which significant portions of the given unknown character image is expected, and said light conductive means including a plurality of substantially straight light pipes of smaller cross-sectional area than the light pipes of said first set so that more than one of the smaller area pipes can be aligned with each of the larger area light pipes.

5. The reading machine of claim 4 wherein the ends of said first set of light opposite said mosaic are side-by-side to form a linear transformation line thereof, said photocells also being arranged side-by-side to form a line which is spaced from and transverse to the light pipe ends line so that the plurality of smaller area pipes are not required to intersect each other in optically coupling the first set of light pipes with said photocells.

6. In an optical character reading machine for characters on a contrasting background, means to sequentially form an image of each unknown character to be identified, an image receiving surface on which the image of one of said unknown characters is formed, means associated with said surface for transforming parts of said surface and hence parts of said character to a predetermined geometric pattern of discrete light transmitting areas with each area containing a portion of said character or its background, a plurality of photocells, there being at least one photocell for each character to be identified, and optical logic combining means including groups of light conductors connected between preselected areas of said pattern and said photocells in a manner such that said surface parts of interest for each character are examined by said individual photocells.

7. The optical character reading machine of claim 6 wherein the light conductors of said groups have cross-sectional areas smaller than said light transmitting areas so that more than one light conductor can be aligned with the same light transmitting area to accomplish the optical logic function of said optical logic combining means.

8. The subject matter of claim 7 wherein said photocells are physically arranged transverse to said transformed pattern so that said groups of light conductors are substantially separate from each other.

9. In an optical character reading machine for characters on a contrasting background; means for forming an image of one of said characters and its background; a receiving surface on which said image is formed; means to conduct light from discrete parts of said surface on which said image is formed to individual light distribution areas in a manner such that the total of all of said areas emits a dissected image of the character and its background; a group of assertion photocells for the character; a plurality of negation photocells; and optical logic combining means including a group of light conductive members for each character, for optically coupling preselected light distribution areas containing said dissected image to said photocells; each of said groups of members including members coupled between said assertion photocells and preselected distribution areas, and at least one of said groups having one member coupling a predetermined distribution area with a preselected negation photocell.

10. The subject matter of claim 9 and electronic means including decision means, operatively connected with said assertion and negation photocells, for identifying the characters whose images are formed on said receiving surface.

References Cited by the Examiner

UNITED STATES PATENTS

| | | | |
|---|---|---|---|
| 2,881,976 | 4/1959 | Greanias | 340—146.3 |
| 3,125,683 | 3/1964 | Steward et al. | 340—146.3 |

OTHER REFERENCES

Pages 76 and 77, 10/1961, IBM Technical Disclosure Bulletin, vol. 5, No. 5.

MALCOLM A. MORRISON, *Primary Examiner.*